US006064539A

United States Patent [19]

Null et al.

[11] Patent Number: 6,064,539

[45] Date of Patent: May 16, 2000

[54] METHOD OF RETRACTING A READ AND/OR WRITE HEAD FOR PARKING

[75] Inventors: Michael W. Null, Santa Cruz; Francesco Carobolante, Scotts Valley; Karl M. Schlager, Campbell, all of Calif.

[73] Assignee: STMicroelectronics, Inc., Carrollton, Tex.

[21] Appl. No.: 08/989,094

[22] Filed: Dec. 11, 1997

[51] Int. Cl.[7] ........................ G11B 5/54

[52] U.S. Cl. ........................ 360/75; 360/73.03

[58] Field of Search ........................ 360/75, 73.03, 360/78.04, 105

[56] References Cited

U.S. PATENT DOCUMENTS

| | | | |
|---|---|---|---|
| 5,227,930 | 7/1993 | Thanos et al. | 360/78.04 |
| 5,495,156 | 2/1996 | Wilson et al. | 360/75 X |
| 5,781,363 | 7/1998 | Rowan et al. | 360/75 X |

*Primary Examiner*—Aristotelis M. Psitos
*Assistant Examiner*—James L Habermehl
*Attorney, Agent, or Firm*—Theodore E. Galanthay; Lisa K. Jorgenson

[57] ABSTRACT

A method of parking the head by first moving the head toward the inner diameter of the disc an then back across the disc and parking the head on a flat part of a ramp. In one embodiment, a moderate voltage on the motor drives the head toward the inner diameter of the disc until the head hits the inner crash stop and then a moderate current drives the head back across the disc to give the head enough momentum to get to the flat part of he ramp. In another embodiment, more stages, each having a different voltage, are used to get better control of the velocity of the head as it is being driven across the disc. A higher voltage is also used to turn the head to move toward the inner diameter of the disc when it is moving fast toward the outer diameter. A retract circuit controls the movement of the head during retract. To be able to drive the head in the tow directions, the retract circuit needs to be bipolar, containing both a current source and a current sink. Counters are used to time the driving of the head. Driving the head toward the outer diameter of the disc across substantially the entire disc permits the head to gather momentum as the head approaches the ramp, and use a lower current to ensure that the head gets to the flat art of the ramp where it is then parked. Parking the head on the flat part of the ramp prevents the head from landing on the disc, preventing damage to the head and the disc, and eliminating the possibility of loss or corruption of data due to the head landing on the disc.

25 Claims, 5 Drawing Sheets

METHOD OF RETRACTING A READ AND/OR WRITE HEAD FOR PARKING

BACKGROUND

The present invention relates to a read and/or write head, and is more specifically related to an improved method of parking the read and/or write head.

Heads for reading and writing information are used in data storage systems, such as disc drives. Many data storage systems are designed for both the recording and the retrieval of data, and therefore require both a write and a read head. For example, conventional disc drives are used to both record and retrieve information. Typically, one head, a read/write head, is used for both the recording and the retrieval of data. Referring to FIG. 1, multiple heads 40 (only one of which is shown) are mounted on a head stack assembly (HSA), which typically also includes a voice coil motor 16, an arm assembly 116, a preamplifier (not shown), a flexible circuit 48 and flexible circuit board 42. The flexible circuit 48 and flexible circuit board 42 connect the heads 40, and preamplifier together, and connect them to a printed circuit board 44 attached to the outside of the housing of the HSA.

FIG. 1 is an exploded view of an information storage system 10, hereinafter disc drive 10, having one or more heads 40. The disc drive 10 includes actuator arms 14 driven by a voice coil motor 16, herein after motor 16. The actuator arms 14 extend from a pivot assembly 20, located at one end of the motor 16, and over the discs 18 to position one of the heads 40 over the selected track of one of the discs 18. The motor 16 is driven thought the spindle motor, which is driven by a driver circuit 50 that responds to signals received at extension pins to provide the force necessary to rotate the actuator arms 14 about the pivot 20 to position one of the heads 40 over a desired track on one of the rotating discs 18.

Each actuator arm 14 includes a substantially triangular shape rigid arm 12 and either one or two suspensions 30 supported by the rigid arm 12. The rigid arm 12 is mounted at the pivot 20 around which the actuator arm 14 rotates. One head 40 is mounted at the opposite end of the suspension 30 from the connection to the rigid arm 12. Referring to FIG. 2, each actuator arm 14*a* . . . 14*d* can support one or two suspensions 30*a* . . . 30*f*, each supporting a head 40*a* . . . 40*f*, respectively. One suspension 30*b*, 30*d*, 30*f* is for writing data to and reading data from the disc 18*a*, 18*b*, 18*c* above the actuator arm 14*b*, 14*c*, 14*d*, respectively, and the other suspension 30*a*, 30*c*, 30*e* is for writing data to and reading data from the disc 18*a*, 18*b*, 18*c* below the actuator arm 14*a*, 14*b*, 14*c*, respectively. The top and bottom actuator arms 14*a*, 14*d* only need one suspension, designated 30*a* and 30*f*, respectively.

Referring again to FIG. 1, each of the heads 40 reads data from and writes data to selected tracks on the surface of the disc 18. In retract, the position of the heads 40 is determined by the motor 16 which is supplied by the rectified voltage on the spindle motor, rectified through the diodes on the drivers. The spindle motor responds to electrical signals from the driver circuit 50 supplied through a preamplifier (not shown).

While the disks 18 are spinning, the aerodynamics of the discs 18 and the heads 40 keep the heads 40 flying above the discs 18. When the discs 18 stop from spinning, then there is no more aerodynamics and the heads 40 tend to land on the discs 18. The heads 40 landing on the discs 18 can damage both the heads 40 and the discs 18, and can even destroy or corrupt the information on the discs 18 at the locations where the heads 40 land.

The heads 40 landing on the discs 18 is even a larger problem in laptop computers, since the computer are being moved, and occasionally dropped. This can cause the heads 40 to land on the discs 18 with a large force and damage both the heads 40 and discs 18. Additionally, with the new way discs 18 are being polished, heads 40 landing on the discs 18 even with a smaller force can damage the discs 18.

To prevent the heads 40 from landing on the discs 18, it is becoming common now for disc drives 10 to contain ramps 60 on which the heads 40 can be placed when they are parked. Referring to FIG. 3, when a retract signal notifies the disc drive 10 to stop, the heads 40*a* . . . 40*f* are driven from the location they are at to the outer diameter of the discs 18 and then up to the flat parts 62*a* . . . 62*f* of the ramps 60*a* . . . 60*c*. The ramps spread apart the suspensions 30*a* . . . 30*f*, and the head are parked on the ramps 60*a* . . . 60*c*.

One problem with parking the heads 40*a* . . . 40*f* on the ramps 60*a* . . . 60*c* is that moving the heads 40*a* . . . 40*f* to the flat part of the ramps 60*a* . . . 60*c* can require a great deal of momentum, which requires the driver circuit to generate a high current level in the motor. The back emf is used to park the heads 40*a* . . . 40*f*, and when a large current is drawn to force the heads 40*a* . . . 40*f* up the ramps the back emf can drop, causing the driver circuit 50 to fail. This leaves the heads 40*a* . . . 40*f* at the bottom of the ramps, on the outer diameter of the discs, which, as explained above, can damage both the heads and the discs, and can destroy or corrupt the information on the discs.

SUMMARY OF THE INVENTION

A method of parking a head that is positioned by a motor over a storage media having a inner diameter and an outer diameter includes first moving the head toward the inner diameter of the storage media, then moving the head toward the outer diameter of the storage media and stopping the head on a ramp located at the outer diameter. A driver circuit for use with the method includes a retract circuit that is capable of operation in bipolar mode to generate signals to allow the motor to move the head between positions at the outer diameter and the inner diameter, and a sequencer to generate the commutation signals upon receiving a retract signal to move the head toward the inner diameter and toward the outer diameter of the disc.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

DETAILED DESCRIPTION OF THE PREFERRED EMBODIMENTS

Figure 4:
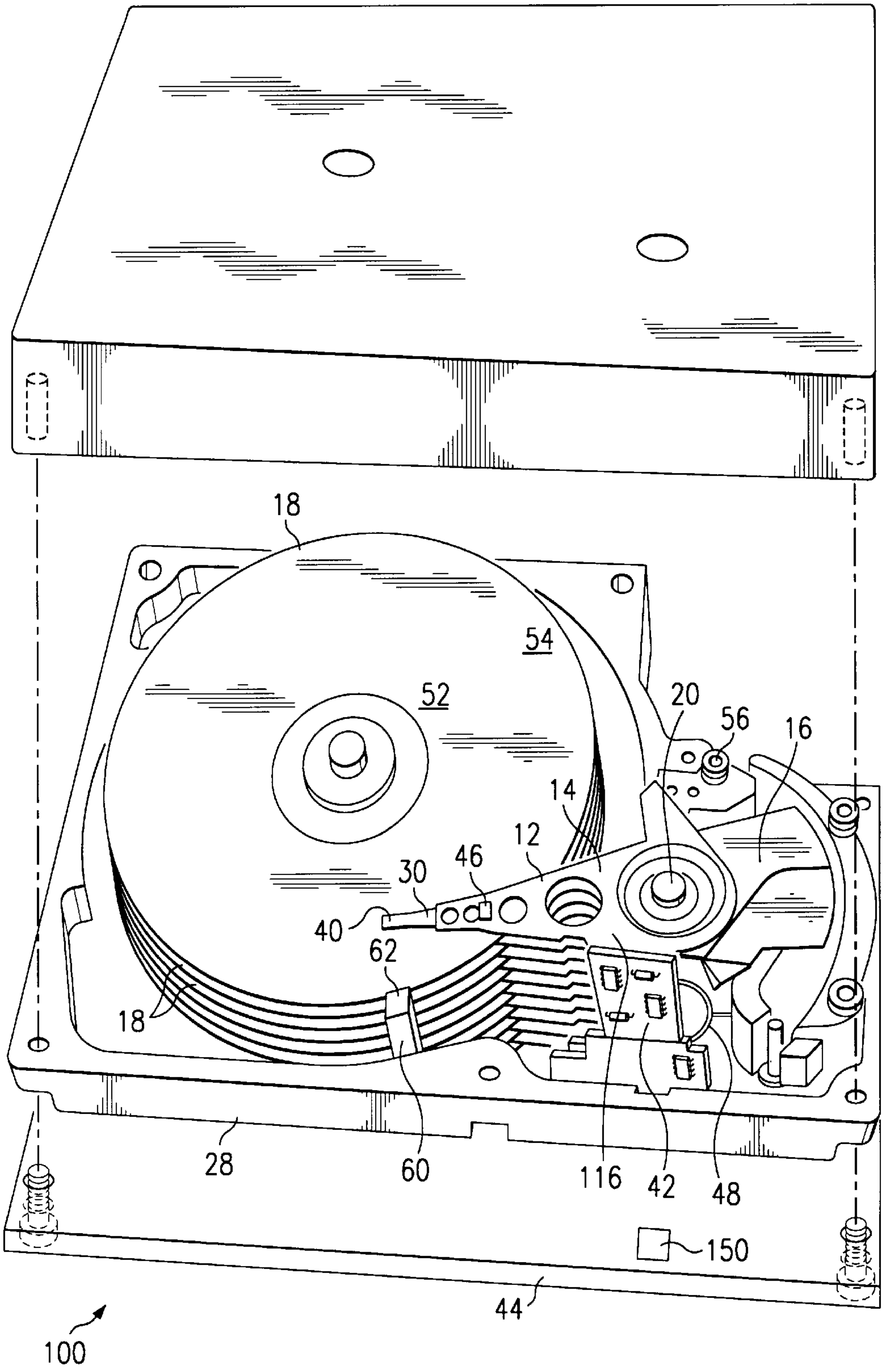
FIG. 4 is an exploded perspective view of a disc drive according to the present invention.

Referring to FIG. 4, a driver circuit according to an embodiment of the invention is designated generally by reference numeral 150. The driver circuit 150 is typically included in a data storage system 100, such as a disk drive, hereinafter disc drive 100.

Disc drive 100 includes one or more heads 40. Typically each head has an MR transducer, but can have another transducer such as a coil transducer. The head is a read/write head. In alternate embodiments, the head can include only read or only write circuitry, in the preferred embodiment it includes both.

The disc drive 100 also includes a plurality of actuator arms 14 that extend over the discs 18 from a pivot assembly 20, located at one end of a voice coil motor 16, hereinafter motor 16. The actuator arms 14 are driven by the motor 16 to position the head 40 that is on the actuator arm 14 over the selected track of disc 18. The motor 16 responds to signals received at extension pins to provide the force necessary to rotate the actuator arms 14 about the pivot 20 to position the head 40 over a desired track on the corresponding rotating disc 18. In retract, the position of the head 40 is determined by the motor 16 which is supplied by the rectified voltage on the spindle motor, typically rectified through the diodes on the drivers. The spindle motor responds to electrical signals from a driver circuit 150 supplied through the preamplifier (not shown).

Figure 1:
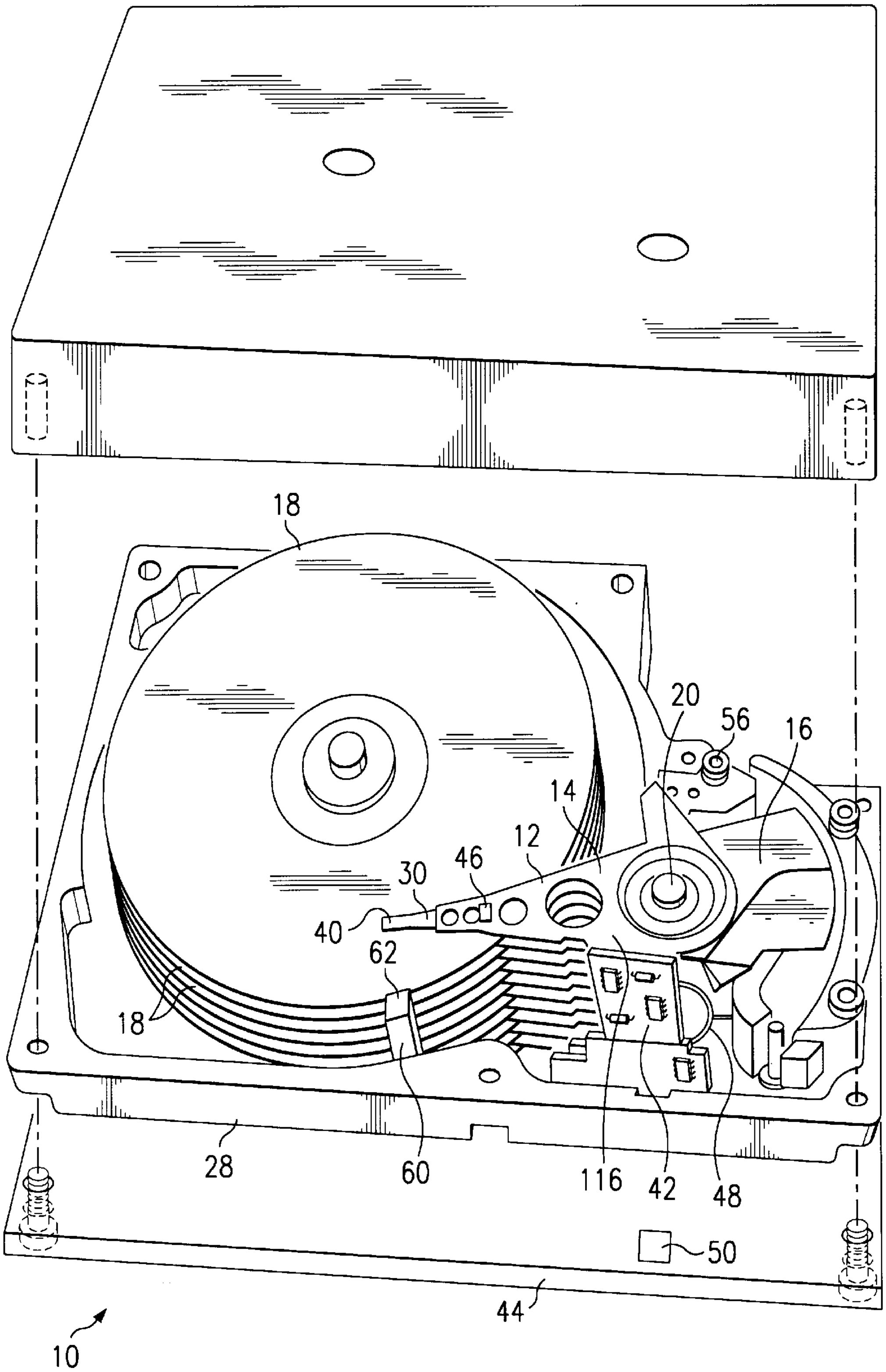
FIG. 1 is an exploded perspective view of a conventional disc drive.
Figure 2:
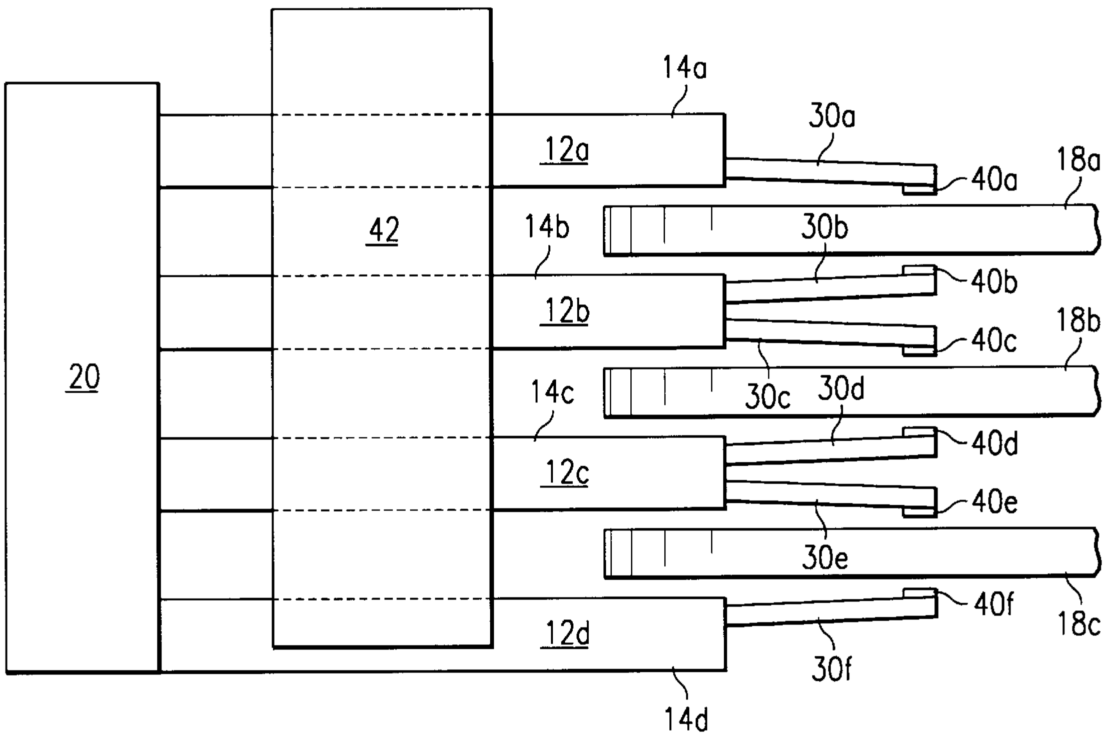
FIG. 2 is a schematic representation of a side view of a portion of the disc drive in FIG. 1 and in FIG. 4.
Figure 3:
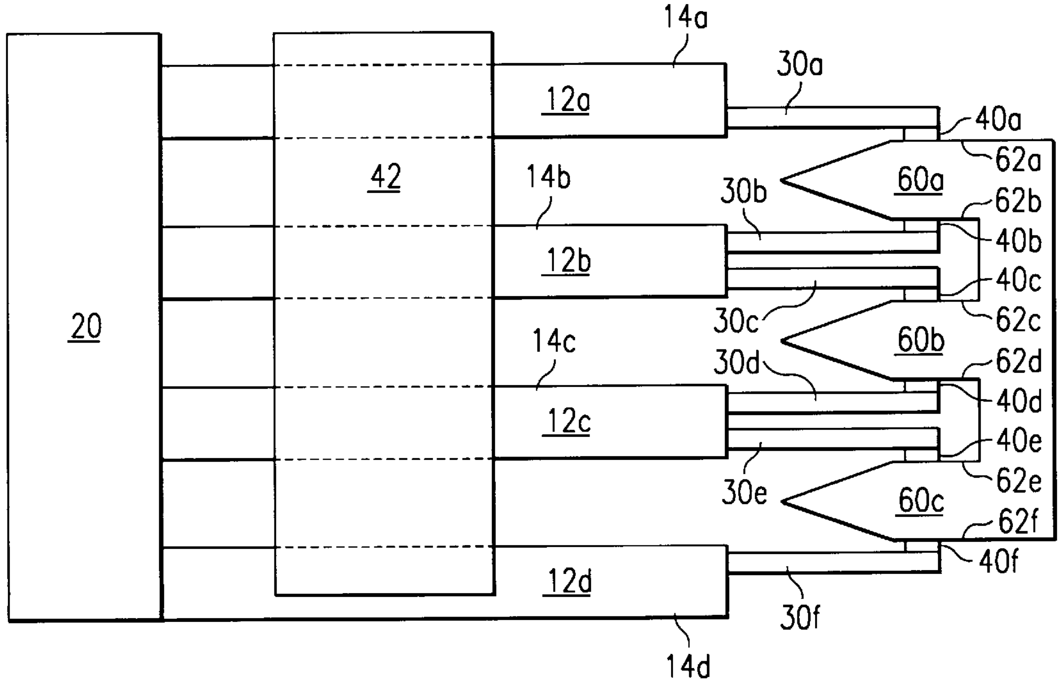
FIG. 3 is a schematic representation of another side view of a portion of the disc drive in FIG. 1 and in FIG. 4.

Each actuator arm 14 includes a substantially triangular shaped rigid arm 12 and a suspension 30 supported by the rigid arm 12. The rigid arm 12 is mounted at the pivot 20 around which the actuator arm 14 rotates. The head 40 is mounted at the opposite end of the suspension 30 from the connection to the rigid arm 12. Referring to FIG. 2, as in conventional disc drives, each actuator arm 14 can support one or two suspensions 30, each supporting a head. One suspension 30*b*, 30*d*, 30*f* is for writing data to and reading data from the disc above 18*a*, 18*b*, 18*c* the actuator arm 14*b*, 14*c*, 14*d*, respectively, and the other suspension 30*a*, 30*c*, 30*e* is for writing data to and reading data from the disc 18*a*, 18*b*, 18*c* below the actuator arm 14*a*, 14*b*, 14*c*, respectively. The top and bottom actuator arms 14*a*, 14*d* only need one suspension 30*a*, 30*f*. Although only 3 discs and 4 actuator arms are shown more are usually employed. Referring again to FIG. 4, also mounted on the actuator arms 14 is a flex circuit board 42, which is connected by flex circuit 48 to the printed circuit board 44. The head stack assembly is typically sealed and the printed circuit board 44 is outside the head stack assembly. The disc drive 100 may also include various other circuitry (not shown).

Figure 5:
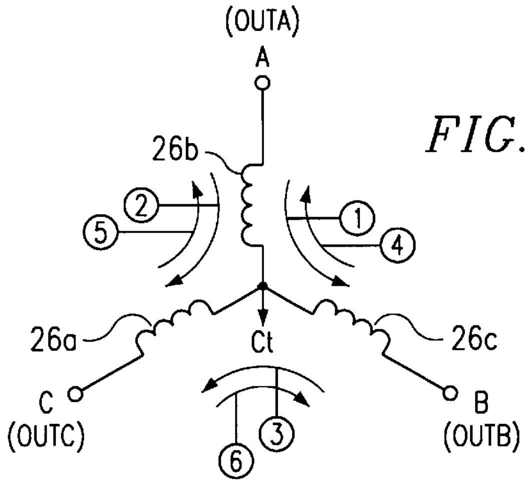
FIG. 5 is a conventional representation of a "Y" configuration coil arrangement of a motor.

A conventional motor 16 can be viewed as having three coils A, B, and C connected in a "Y" configuration, as shown in FIG. 5, although a larger number of stator coils are usually employed with multiple rotor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each typically separated by 90°.

During operation, coils A, B, and C are energized with a drive signal that causes electromagnetic fields to develop about the coils. The resulting attraction/repulsion between the electromagnetic fields of the coils A, B, and C and the magnetic fields created by the magnets in the motor causes the rotor assembly of the motor rotate. While rotating, the rotor assembly causes a back emf signal to be generated in the coils A, B, and C due to the movement of the magnets in relation to B, and C.

The coils are energized in the sequences to produce a current path through two coils of the "Y", with the third coil left floating, hereinafter floating coil FC. The sequences are arranged so that as the current paths are changed, or commutated, one of the coils of the current path is switched to float, and the previously floating coil is swiched into the current path. The sequences are defined such that when the floating coil is swiched into the current path, the direction of the current in the coil that was included in the prior current path is not changed. In this manner, six commutation sequences, or phases, are defined for each electrical cycle in a three phase motor, as show in Table A.

TABLE A

| Phase | Current flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

Figure 6:
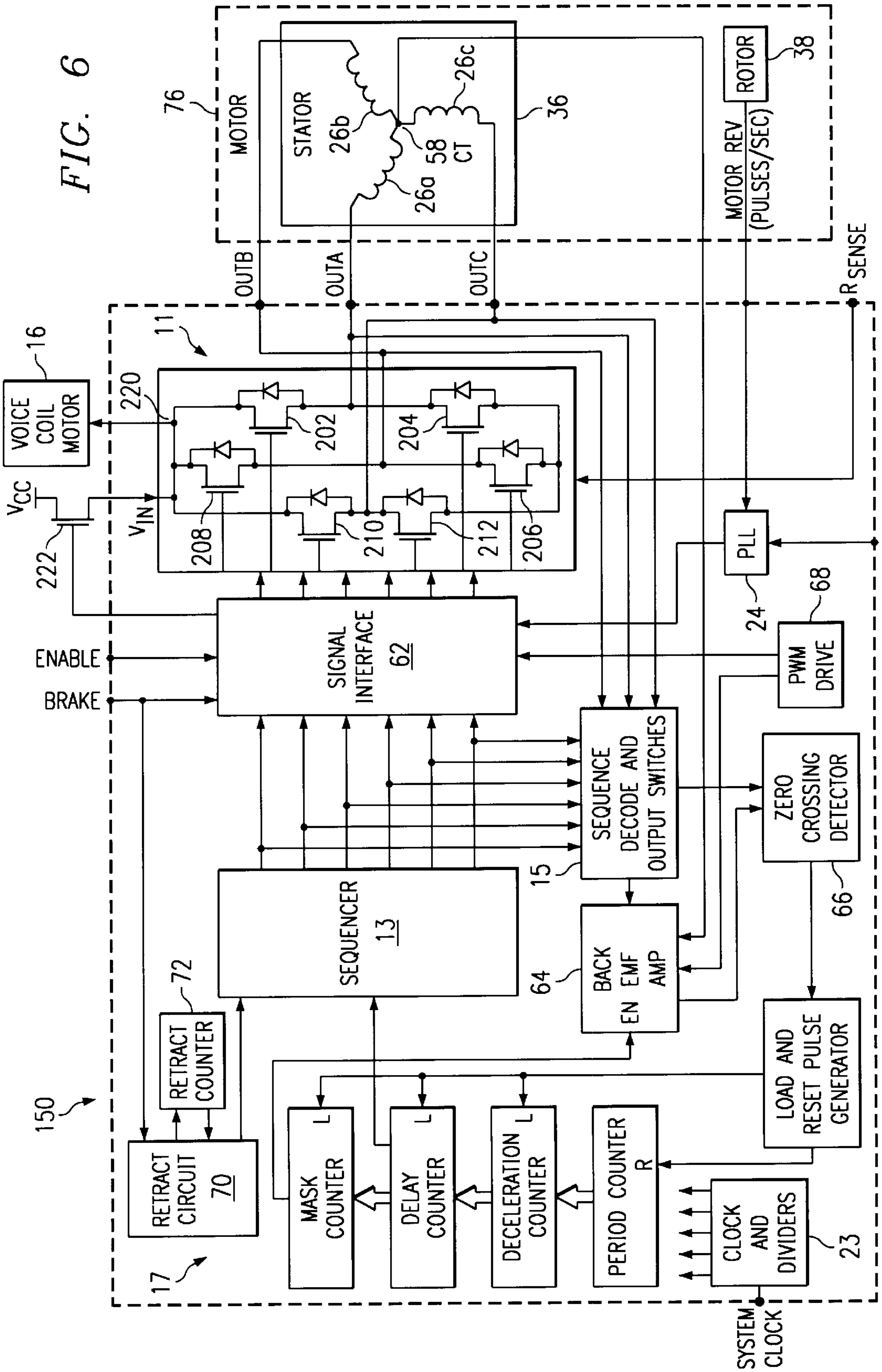
FIG. 6 is a schematic representation of a portion of a motor and a driver circuit according to an embodiment of the present invention.

FIG. 6 shows a typical architecture of the spindle motor 76 and a driver circuit 150 for driving the spindle motor 76. Individual elements shown in FIG. 6 are suitably made in accordance with prior practice, as described in detail in U.S. Pat. Nos. 5,317,243 and 5,294,877 which are incorporated into this specification by reference. Specifically, the motor 76 consists of the stator 36 driven by the driver circuit 150. Although the driver circuit 150 can be constructed of discrete components, preferably, the driver circuit 150 is integrated onto a single semiconductor chip adapted for connection to the stator coils 26*a*, 26*b*, and 26*c* of a three phase dc brushless spindle motor. The stator coils 26*a*, 26*b*, and 26*c* are connected to output nodes OUTA, OUTB, OUTC and CT 58. One end of each of the coils 26*a*, 26*b*, 26*c* is connected to the common center tap 58. The other end is connected to one of he output nodes, respectively designated OUTA, OUTB, OUTC, which are connected to a power stage 11.

A driving voltage is provided to the stator coils 26*a*, 26*b*, and 26*c* by the power stage 11, which is configured to have one high side driver HSA 202, HSB 208, and HSC 210 and one low side driver LSA 204, LSB 206, and LSC 212 for each of the stator coils 26*a*, 26*b*, and 26*c*. The power stage 11 is sequenced to provide sequential control output signals to the stator coils 26*a*, 26*b*, and 26*c* by a sequencer circuit 13. A signal interface circuit 62 supplies the output signals from the sequencer circuit 13 to the power stage 11, as well as enabling other functions, such as brake and output enable functions. The sequencer circuit 13 also provides drive signals to other circuits of the driver circuit 150 through sequence decode and output switches 15 to control the various aspects of rotation of the spindle motor 76. The voltage on the spindle motor 76 is rectified through the diodes of the high side drivers HSA 202, HSB 208, HSC 210 to supply the motor 16.

The stator coils 26*a*, 26*b*, and 26*c* are switchably connected to a back emf amplifier 64. The back emf amplifier 64 in turn delivers signals to a zero crossing detector 66, which provides input signals to a digital timing circuit 17.

The driver circuit 150 includes system clock circuitry 23, phase lock loop (PLL) frequency/phase detector circuitry 24, and may include various other circuitry, such as a PWM drive 18 to support pulse width modulation operation mode of the motor, “align and go” start up circuitry (not shown) to facilitate start up of the motor from a stopped condition, port control logic and associated shift register circuitry (not shown) to facilitate control of the driver circuit 150 by an external microprocessor (not shown), and so forth.

The switching of the driver transistors HSA 202, HSB 208, HSC 210, LSA 204, LSB 206, and LSC 212 of the power stage 11 to effect the switching currents for each phase is accomplished by the sequencer circuit 13. The sequencer circuit 13 provides signals to the high side drivers transistors HSA 202, HSB 208, HSC 210 and the low side drivers transistors LSA 204, LSB 206, and LSC 212 to accomplish the switching sequence outlined above in Table A.

The commutation among the stator coils 26*a*, 26*b*, and 26*c* is performed in response to information indicating the specific position of the rotor 38 in conjunction with circuit information indicating the desired position of the rotor 38. More specifically, the commutation to apply the next drive sequence of Table A is determined in response to a corresponding coil reaching a particular rotational position and its correlation with sequencer information indicating where the motor 34 should be when a commutation is to occur.

During retract, when the head is to be parked, the retract circuit 70 controls the sequencer 13 to produce the commutation signals to the high and low side drivers in the power stage that commutates the coils in the stator 36. Most conventional disc drives only move the head toward the inner diameter of the disc 18 during retract, and therefore use only a unipolar retract circuit, and some move the head only toward the outer diameter of the disc during retract to try to park the head on the ramp also using only a unipolar retract circuit. In the current invention, the retract circuit 70 need to generate signals that can generate both positive and negative voltages, for the motor 16 to move the head toward the inner diameter and toward the outer diameter of the disc, requiring a bipolar retract circuit 70, with a current source and a current sink, or a positive and negative programming voltage. Retract counters 72 are used to time the amount of time the head is being moved in a particular direction with a particular speed, although counters already in the driver circuit 150 that are not used during retract can by used.

Referring again to FIG. 4, in operation, according to one embodiment of the present invention, when a retract signal is received from the processor in the computer containing the disc drive 100 moving the head 40 first toward the inner diameter 52 of the disc 18 until the actuator arms 14 hit the inner crash stop 56, then moving the head 40 toward the outer diameter 54 of the disc 18 until the head 40 is on the ramp 60 and stopping the head 40 on the flat part of the ramp 60.

Figure 7:
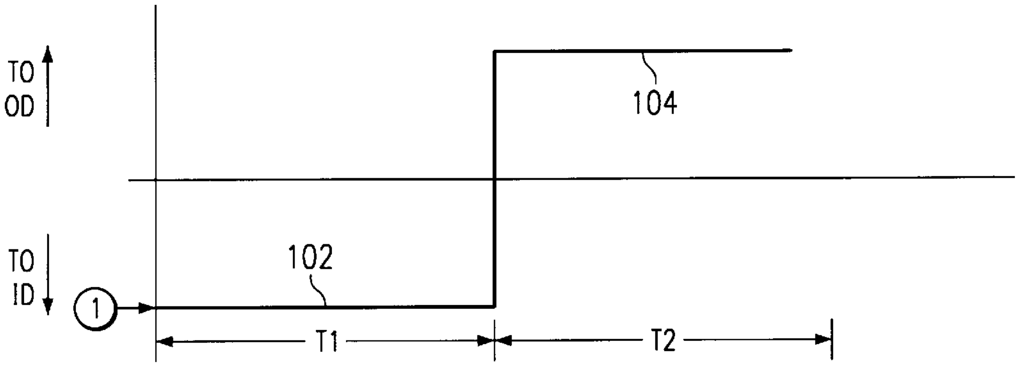
FIG. 7 shows a graph of the voltage on the motor during the retract of the head according to an embodiment of the invention that employs two voltage stages.

Referring to FIGS. 4, 6, and 7 concurrently, during retract the switch 222 that normally connect the motors 76, 16 to Vcc is open. Moving the head 40 toward the inner diameter 52 of the disc 18 can be accomplished by the sequencer 13 generating commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high and low side drivers to supply the drivers motor 16, which then generate the inner driving voltage 102 on the motor 16.

The inner driving voltage 102 is a steady voltage that produces a current that can move the head 40 toward the inner diameter 52 at a moderate speed. The inner driving voltage 102 should be strong enough to produce a current to turn the head to move it toward the inner diameter 52 of the disc 18 if the head is moving toward the outer edge, yet weak enough not to damage the head 40 when it crashed into the inner crash stop 56. Preferably, the inner driving voltage is any value between 200 and 600 mV, and is most preferably about 400 mV, to produce a current of between 40 to 100 mA to move the head 40 at any speed between 10"/s and 30"/s.

The processor coupled to the disc drive 100 typically monitors the position of the head 40, the direction on which the head 40 is moving and the speed with which the head 40 is moving. A logic signal based on this information is generated by the processor and stored in a register in the driver circuit 150. The duration of time that the head 40 is driven toward the inner diameter 52 of the disc 18 is timed by the retract counters 72 and may be dependent on how far away the head 40 is form the inner diameter 52 when the retract signal is received an the speed with which the head 40 is moving.

After the actuator arms 14 hit the inner crash stop 56, or when the head reaches the inner diameter 52, it is moved toward the outer diameter 54 of the disc 18 by the sequencer 13 generating commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high side drivers to supply the motor 16, which then generates an outer driving voltage 104 on the motor 16. The outer driving voltage 104 can be a steady voltage, or an increasing voltage, that produces a current that can move the head 40 toward the outer diameter 54 at a moderate speed. The outer driving voltage 104 should be strong enough to produce a current to get the head 40 to the flat part of the ramp 60, taking into account the momentum built up by driving the head 40 all the way across the disc 18. The outer driving voltage 104 may be about the same in amplitude as the inner driving voltage 102, although the two voltages differ in sign. However, the inner and outer driving voltage can differ in amplitude. The duration of time the head is driven toward the outer diameter of the disc is timed by the retract counters and may be dependent on the speed with which the head 40 is moving and the radius of the disc. In a conventional 3½" disc drive 100, moving between 10"/s and 30"/s, the head 40 may be driven toward the outer diameter of the disc 18 for abut 40 to 60 ms.

By first moving the head 40 toward the inner diameter 52 of the disc 18, regardless of where the head is located when the retract signal is received, the head 40 can be moved all the way across the disc 18 when it has to go to the flat part of the ramp 60, giving the head enough momentum to make it to the flat part of the ramp 60 without risking stopping at the interface of the ramp due to the impact against the ramp.

Figure 8:
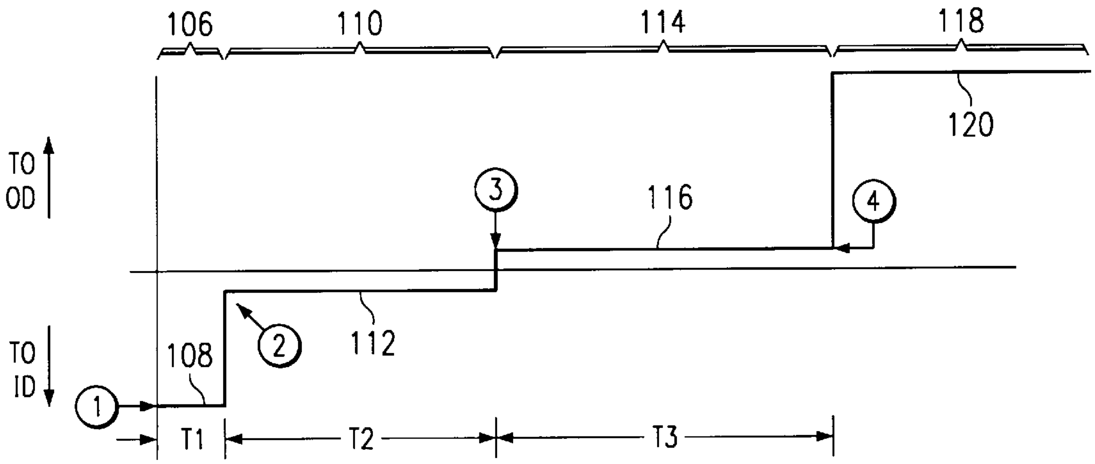
FIG. 8 shows a graph of the voltage on the motor during the retract of the head according to another embodiment of the invention that employs four voltage stages.

FIG. 8 shows the voltages for an alternative method of parking the heads 40 according to the current invention. Referring to FIGS. 4 and 8 concurrently, moving the head 40 toward the inner diameter 52 of the disc 18 and then back across the disc 18 to the outer diameter 54 can be accomplished in two stages each, allowing better control of the velocity of the head 40.

When the retract signal is received, if the head is located near the outer diameter 54 of the disc 18 and moving fast toward the outer diameter 54 of the disc 18, such as when the disc drive 100 is performing a seek on the outermost few tracts of the disc 18, the retract circuit 70 goes into the first stage 106. The sequencer 13 generates commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high side drivers to supply the motor 16, which then generates a turning voltage 108 on the motor 16. The turning voltage 108 is high, to produce a current that turn the head 40 to move toward the inner diameter 52 of the disc 18, and is applied just long enough to turn the head 40 and start it moving toward the inner diameter 52. Preferably, the turning voltage 108 has any value between 0.5 and 5 V and is applied for about 5 to 10 ms, to produce a current that can turn the head 40, typically any value in the range between 100 to 300 mA.

The first state 106 is only entered if the head 40 is located near the outer diameter 54 of the disc 18 and moving fast toward the outer diameter 54 if the disc 18, otherwise the sequencer 13 starts off in the second stage 110, generating commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high side drivers to supply the motor 16, which then generates an inner driving voltage 112 on the motor 16. The inner driving voltage 112 is a steady voltage that produces a current that can move the head 40 toward the inner diameter 52 at a low speed. The voltage should be strong enough to produce a current to move the head 40 toward the inner diameter 52 of the disc, yet weak enough not to damage the head 40 when it crashed into the inner crash stop 56. Preferably, the inner driving voltage 112 can be any value between 200 and 500 mV, to produce a current between 20 o 30 mA to move the head 40 at any speed between 10"/s and 20"/s.

After the actuator arms 14 hit the inner crash stop 56 or reaches the inner diameter 52, the head 40 is moved toward the outer diameter 54 of the disc 18, just up the ramp, in the third stage 114. The retract sequencer 13 generates commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high side drivers to supply the motor 16, which then generates an outer driving voltage 116 on the motor 16. The outer driving voltage 116 can be a steady voltage or can be an increasing voltage. The outer driving voltage 116 produces a current that can move the head 40 towards the outer diameter 54 at a low speed. The outer driving voltage 116 should be strong enough to produce a current to move the head 40 all the way across the disc 18 generating enough momentum to help the head 40 get to the flat part of the ramp 60. The outer driving voltage 116 may be about the same in amplitude as the inner driving voltage 112, although the two voltage are different in sign. The inner and outer voltage can differ in amplitude. Preferably, the outer driving voltage 116 can be any value between 200 and 500 mV, to produce a current between 20 to 30 mA to move the head at any speed between 10"/s and 20"/s for about 50 to 60 ms.

When the head 40 reaches the outer diameter 54 of the disc 18, right next to the ramp 60, the retract circuit enters the fourth stage 118. The sequencer 13 generates commutation signals on the high HSA 202, HSB 208, and HSC 210, and low LSA 204, LSB 206, and LSC 212 side drivers to generate the supply voltage Vin of both motors 76, 16, or the voltage on the spindle motor 76 is rectified by the diodes of the high side drivers to supply the motor 16, which then generates a ramp voltage 120 on motor 16. The ramp voltage 120 should be high enough to produce a current that can move the head 40 to the flat part of the ramp 60, taking into account the momentum generated by moving the head 40 all the way across the disc 18. The ramp voltage 120 is typically the highest voltage you can still get out of the system at this point. Preferably, the ramp voltage 120 can be any value between 0.5 and 3 V, to produce a current of about 100 mA.

Alternatively, when the head 40 is close to the inner diameter 52 of the disc 18, the retract circuit 70 can skip the second stage 110 and start the retract in the third stage 114. If the head 40 is moving toward the inner diameter 52, the current produced in the third stage 114 will typically keep the head 40 moving toward the inner diameter 52 until the head 40 hits the inner crash stop 56 and then move the head 40 toward the outer diameter 54 once the momentum of hitting the inner crash stop 56 turns the head 40. If the head 40 is moving toward the outer diameter 54, entering the third stage 114 will keep the head 40 moving toward the outer diameter 54, but will bring the speed with which the head is moving to the low speed produced by the outer driving current 116.

Skipping the second stage 110 and entering the third stage 114 should only be done when the head 40 is close enough to the inner diameter 52 that enough momentum will be generated by moving the head 40 the remainder of the disc 18 to assist the current generated in the fourth stage 118 to move the head 40 to the flat part of the ramp 60. Typically, this is only done when the head 40 is over the innermost few tracts of the disc 18.

A method of parking the head 40 by first moving it toward the inner diameter 42 of the disc 18 and then back across the disc 18 gives the head 40 enough momentum to make it to the flat part of the ramp 60 without requiring a large current to be generated on the motor 16 to force the head 40 to the flat part of the ramp 60. This can be accomplished in two or more stages. A moderate voltage on the motor can move the head toward the inner diameter of the disc until the head hits the inner crash stop and then a moderate current can move the head back across the disc to give the head enough momentum to get to the flat part of the ramp 60. Alternatively, more stages, can be used to get better control of the velocity of the head as it is moving across the disc, with higher voltages used to get the head to the flat part of the ramp 60 and to turn the head in the right direction when it is moving fast in the other direction. Moving the head toward the outer diameter 54 of the disc across substantially the entire disc permits the head to gather momentum as the head approaches the ramp 60. This allows the head to use a lower current, which is all that many motors can generate during retract, to ensure that the head gets to the flat part of the ramp where it is parked. Parking the head on the flat part of the ramp prevents the head form landing on the disc, preventing damage to the head and the disc, and eliminating the possibility of loss or corruption of data due to the head landing on the disc.

It should be noted that although a preferred embodiment of the invention is described with regard to a three phase motor, in particular, the principles of the invention can be equally advantageous applied to motors in general.

Although the invention has been specifically described with reference to several preferred and alternative embodiments, it will be understood by those skilled in the art having reference to the current specification and drawings that various modifications may be made and firther alternatives are possible without departing from the spirit and scope of the invention as set forth in the appended claims.

We claim:

1. A method of parking a head on a ramp, the head being positioned by a motor over a storage media having a inner diameter and an outer diameter, comprising:

moving the head toward the inner diameter of the storage media;

moving the head toward the outer diameter of the storage media;

stopping the head on the ramp.

2. The method of claim 1, wherein:

moving the head toward the inner diameter of the storage media comprises generating an inner driving voltage on the motor for moving the head toward the inner diameter of the storage media at a moderate velocity; and moving the head toward the outer diameter of the storage media comprises generating an outer driving voltage on the motor for moving the head toward the outer diameter of the storage media at a moderate velocity.

3. The method of claim 2, wherein the inner driving voltage being approximately between 200 and 600 mV.

4. The method of claim 2, wherein the outer driving voltage being approximately between 0.5 and 3 V.

5. The method of claim 1, further comprising the steps of determining the position of the head;

determining the direction the head is moving;

determining whether the head is moving fast; and wherein:

moving the head toward the inner diameter of the storage media comprises:

when the head is moving fast toward the outer diameter and is near the outer diameter:

generating a turning voltage on the motor for stopping the movement toward the outer diameter and moving the head toward the inner diameter with a turning velocity;

generating an inner driving voltage on the motor for moving the head toward the inner diameter of the storage media at a low velocity;

when the head is not moving fast and not near the outer diameter of the storage media, and when the head is not near the inner diameter of the storage media generating an inner driving voltage on the motor for moving the head toward the inner diameter of the storage media at a low velocity; and moving the head toward the outer diameter of the storage media comprises:

generating an outer driving voltage on the motor for moving the head toward the outer diameter of the storage media at a low velocity;

generating a ramp voltage on the motor for moving the head up the ramp at the outer diameter of storage media.

6. The method of claim 5, wherein the turning voltage being approximately between 0.5 and 5 volts and is applied for approximately 5 to 10 ms.

7. The method of claim 5, wherein the inner and outer driving voltages being approximately between 200 and 500 mV.

8. The method of claim 5, wherein the ramp voltage is between 0.5 to 3 V.

9. The method of claim 5, wherein the inner and outer driving voltages have approximately the same amplitude.

10. A method of parking a head on a ramp, the head is positioned by a motor over a storage media having a inner diameter and an outer diameter, comprising:

generating an inner driving voltage on the motor for moving the head toward the inner diameter of the storage media;

generating an outer driving voltage on the motor for moving the head toward the outer diameter of the storage media; and stopping the head on the ramp.

11. The method ofclaim 10, determining the position of the head;

determining the direction the head is moving;

determining whether the head is moving fast;

responsive to the head moving fast toward the outer diameter and being near the outer diameter generating a turning voltage on the motor for stopping the movement toward the outer diameter and moving the head toward the inner diameter with a turning velocity performed prior to generating an inner driving voltage; and generating a ramp voltage on the motor for moving the head up the ramp at the outer diameter of storage media at a fast velocity, performed after generating an outer driving voltage.

12. The method of claim 11, wherein the ramp voltage is approximately between 0.5 and 3 V.

13. The method of claim 11, wherein the turning voltage is approximately between 0.5 and 5 V and is applied for approximately 5 to 10 ms.

14. The method of claim 10, wherein the inner and outer driving voltages are low.

15. The method of claim 10, wherein the inner and outer driving voltages are approximately between 200 and 500 mV.

16. The method of claim 10, wherein the inner and outer driving voltages have approximately the same amplitude.

17. A driver circuit for operating a motor for positioning a head over a storage medium having an outer diameter and a inner diameter, the driver circuit comprising:

a retract circuit capable of operation in bipolar mode to generate signal to allow the motor to move the head toward the outer diameter and toward the inner diameter for parking the head; and a sequencer for generating a set of commutation signals for parking the head such that responsive to a retract signal the sequencer generates commutation signals to:

move the head toward the inner diameter of the storage media;

move the head toward the outer diameter of the storage media until the head is on the ramp; and stop the head on the ramp.

18. The driver circuit of claim 17, wherein:

moving the head toward the inner diameter of the storage media comprises generating an inner driving voltage on the motor for moving the head toward the inner diameter of the storage media at a moderate velocity; and moving the head toward the outer diameter of the storage media comprises generating an outer driving voltage on the motor for moving the head toward the outer diameter of the storage media at a moderate velocity.

19. The driver circuit of claim 17, further comprising a register storing a signal based on the position, direction, and speed of the head.

20. The driver circuit of claim 19, wherein:

moving the head toward the inner diameter of the storage media comprises:

when the head is moving fast toward the outer diameter and is near the outer diameter:

generating a turning voltage on the motor for stopping the movement toward the outer diameter and moving the head toward the inner diameter with a first velocity;

generating an inner driving voltage on the motor for moving the head toward the inner diameter of the storage media at a low velocity;

when the head is not moving fast toward the outer diameter and not is near the outer diameter of the storage media, and when the head is not near the inner diameter of the storage media, generating an inner driving voltage on the motor for moving the head toward the inner diameter of the storage media at a low velocity; and moving the head toward the outer diameter of the storage media comprises:

generating an outer driving voltage on the motor for moving the head toward the outer diameter of the storage media at a low velocity;

generating a ramp voltage on the motor for moving the head up the ramp at the outer diameter of the storage media.

21. A disc drive coupled to a processor comprising:

a head for performing read operations from a storage medium having an outer diameter and a inner diameter;

a ramp for parking the head;

a motor coupled to the head for positioning the head over the storage medium;

a driver circuit coupled to the motor for operating the head, the driver circuit comprising:

a retract circuit capable of operation in bipolar mode to generate signal to allow the motor to move the head toward the outer diameter and toward the inner diameter for parking the head; and a sequencer for generating a set of commutation signals for parking the head such that responsive to a retract signal the sequencer generates commutation signals to:

move the head toward the inner diameter of the storage media;

move the head toward the outer diameter of the storage media until the head is on the ramp; and stop the head on the ramp.

22. The disc drive of claim 21, wherein the motor comprises a polyphase direct current (dc) motor.

23. The disc drive of claim 21, wherein:

moving the head toward the inner diameter of the storage media comprises generating an inner driving voltage on the motor for moving the head toward the inner diameter of the storage media at a moderate velocity; and moving the head toward the outer diameter of the storage media comprises generating an outer driving voltage on the motor for moving the head toward the outer diameter of the storage media at a moderate velocity.

24. The disc drive of claim 21, further comprising a register storing a signal based on the position, direction, and speed of the head.

25. The driver circuit of claim 24, wherein:

moving the head toward the inner diameter of the storage media comprises:

when the head is moving fast toward the outer diameter and is near the outer diameter:

generating a turning voltage on the motor for stopping the movement toward the outer diameter and moving the head toward the inner diameter with a first velocity;

generating an inner driving voltage on the motor for moving the head toward the inner diameter of the storage media at a low velocity;

when the head is not moving fast toward the outer diameter and not is near the outer diameter of the storage media, and when the head is not near the inner diameter of the storage media, generating an inner driving voltage on the motor for moving the head toward the inner diameter of the storage media at a low velocity; and moving the head toward the outer diameter of the storage media comprises:

generating an outer driving voltage on the motor for moving the head toward the outer diameter of the storage media at a low velocity;

generating a ramp voltage on the motor for moving the head up the ramp at the outer diameter of the storage media.

* * * * *